United States Patent [19]

Kolbe et al.

[11] Patent Number: 5,293,315

[45] Date of Patent: Mar. 8, 1994

[54] CIRCUIT CONFIGURATION FOR AN AUTOMATIVE VEHICLE HAVING TRACTION SLIP CONTROL

[75] Inventors: Alexander Kolbe, Gross-Zimmern; Klaus Honus, Frankfurt am Main, both of Fed. Rep. of Germany

[73] Assignee: Alfred Teves GmbH, Frankfurt am Main, Fed. Rep. of Germany

[21] Appl. No.: 709,861

[22] Filed: Jun. 3, 1991

[30] Foreign Application Priority Data

Jun. 2, 1990 [DE] Fed. Rep. of Germany ....... 4017845

[51] Int. Cl.[5] .................. B60T 8/32; B60K 28/16
[52] U.S. Cl. ................. 364/426.02; 364/426.03; 180/197; 303/102
[58] Field of Search ........... 364/426.02, 426.01, 364/426.03; 180/197; 303/97, 104, 99

[56] References Cited

U.S. PATENT DOCUMENTS

| | | | |
|---|---|---|---|
| 4,675,819 | 6/1987 | Fennel | 364/426.02 |
| 4,788,644 | 11/1988 | Inagaki | 364/426.03 |
| 4,805,102 | 2/1989 | Ise et al. | 364/424.05 |
| 4,932,726 | 6/1990 | Iwata et al. | 364/426.02 |
| 4,946,015 | 8/1990 | Browalski et al. | 180/197 |
| 4,974,694 | 12/1990 | Matsumoto | 180/197 |
| 4,976,329 | 12/1990 | Ise | 364/426.03 |
| 5,025,882 | 6/1991 | Ghoneim et al. | 180/197 |
| 5,058,699 | 10/1991 | Fennel et al. | 180/197 |

FOREIGN PATENT DOCUMENTS

| | | |
|---|---|---|
| 2352323 | 5/1974 | European Pat. Off. . |
| 3342553 | 6/1985 | European Pat. Off. . |
| 3545652 | 6/1987 | European Pat. Off. . |
| 3546575 | 10/1987 | European Pat. Off. . |
| 0270092 | 6/1988 | European Pat. Off. . |
| 3728574 | 11/1988 | European Pat. Off. . |
| 3812599 | 11/1988 | European Pat. Off. . |
| 3741247 | 5/1989 | European Pat. Off. . |
| 3809100 | 9/1989 | European Pat. Off. . |
| 2188996 | 10/1987 | United Kingdom . |

Primary Examiner—Thomas G. Black
Assistant Examiner—Tan Q. Nguyen
Attorney, Agent, or Firm—Robert P. Seitter; J. Gordon Lewis

[57] ABSTRACT

A variable control threshold (RS) is formed by a circuit configuration for the traction slip control through brake management, with the control threshold being composed of a basic threshold (GS) and a portion derived from the wheel slip acceleration. The wheel slip (VR) is compared to the control threshold to determine a control deviation, i.e. the difference between the control threshold (RS) and the wheel slip (VR). The brake pressure pattern (p), during a traction slip control process is controlled in response to the wheel slip acceleration.

11 Claims, 3 Drawing Sheets

CIRCUIT CONFIGURATION FOR AN AUTOMATIVE VEHICLE HAVING TRACTION SLIP CONTROL

TECHNICAL FIELD

The present invention relates to a circuit configuration for an automotive vehicle having traction slip control through brake management (or through brake and motor management), which is capable of controlling the brake pressure in the wheel brake of the wheel tending to race in response to the wheel acceleration and the wheel slippage.

BACKGROUND OF THE INVENTION

For traction slip control through brake management, hitherto, the brake control in the wheel brake of the wheel tending to race has been effected in response to one or two predetermined acceleration thresholds. Moreover, a firm slip threshold optionally dependent on the vehicle speed has been used as a criterion for commencement of the traction slip control. Firmly predetermined thresholds of this type are not capable of handling all situations which are likely to occur. In some cases, commencement of the traction slip control is too early, in others far too late.

SUMMARY OF THE INVENTION

It is, therefore, an object of the present invention to provide a circuit configuration for an automotive vehicle having a traction slip control which is able to adjust the management thresholds of the control and the pressure control or pressure modulation, respectively, even more precisely to the various situations, aiming to substantially improve the control quality compared to conventional circuit configurations of this type.

This problem can be solved by a circuit configuration of the aforementioned type, the operation of which involves a variable control threshold composed of a predetermined basic value ("basic threshold") and a portion derived from the wheel slip acceleration. The wheel slip is comparable to the control threshold and determinable as a control deviation of the difference between the control threshold and the wheel slippage. The brake pressure pattern inclusive of the pressure build-up and/or pressure decrease gradients is controllable in response to the control deviation and to the wheel slip acceleration.

In addition, according to one embodiment of the present invention, the brake pressure already prevailing in the wheel brake has been considered in the control of the brake pressure pattern in response to the control deviation and the wheel slip acceleration. The information on this wheel brake pressure is attainable without any extra efforts once the prevailing pressure is approximately determined with the aid of a so-called wheel pressure model, i.e. by analyzing criteria and signals determining the pressure pattern. DE-OS 38 09 100 already teaches a method and a circuit configuration for forming a wheel pressure model of this type.

According to another embodiment of the present invention, the control threshold is formed according to the following formula:

Control threshold = Basic threshold + Value of correction with the basic threshold corresponding to a predetermined slip value and with the value of correction representing a function of the filtered wheel slip acceleration. The correction value according to one embodiment of the present invention is formed according to the formula Value of correction = $-k \times b_{gef}$ wherein k is a constant and $b_{gef}$ represents the filtered wheel slip acceleration.

In one form of the present invention, a predetermined wheel slip value, dependent on the vehicle speed, serves as a basic threshold. To improve the start-up pattern, it is advisable to lower the basic threshold from an initial value amounting, for example, to 20 km/h linearly to between 10 and 12 km/h at a vehicle speed of between 20 and 30 km/h.

Finally, it is possible, in the practice of the present invention, to design the circuit configuration such that the brake pressure is built-up once the wheel slip exceeds the control threshold, and the brake pressure is decreased once the wheel slip falls below the control threshold.

Further features, advantages and fields of enduse application of the present invention will become evident from the following description with reference to the drawings.

DETAILED DESCRIPTION OF THE INVENTION

Figure 1:
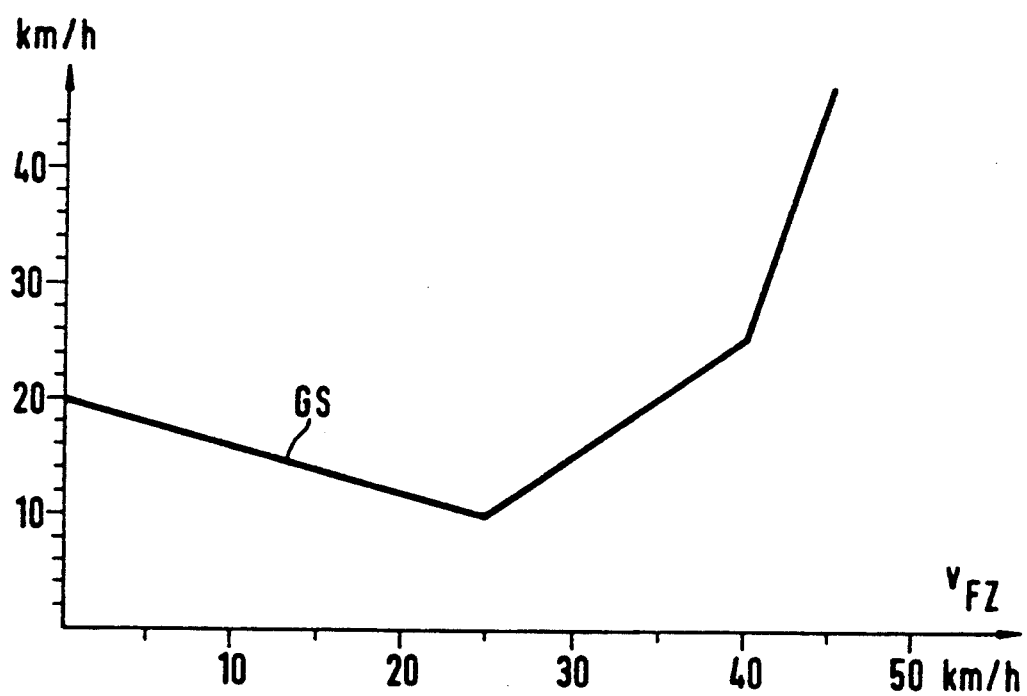
FIG. 1 shows the pattern of the basic threshold over the vehicle speed according to one embodiment of the present invention.

FIG. 1 serves to illustrate the dependence of the basic threshold on the vehicle speed. In the range of between 0 and 25 km/h, in the example as shown, the basic threshold linearly decreases from the initial value of 20 km/h to about 10 km/h. The basic threshold represents the limit value of the wheel slip which, if exceeded, will result in the brake management and in feeding brake pressure into the wheel brake of the wheel concerned. Due to the relatively high limit value of the basic threshold during standstill of the automotive vehicle and at a very low speed, the start-up pattern is improved while, due to the lower limit value at an elevated vehicle speed, the control sensitivity is increased. At an elevated vehicle speed—in the present instance, of about 25 km/h—the relatively high load on the brake will have to be taken into account for which reason the basic threshold is raised and, feasibly, the driving torque of the driving motor is reduced which will not be considered in any detail in this application.

Figure 2:
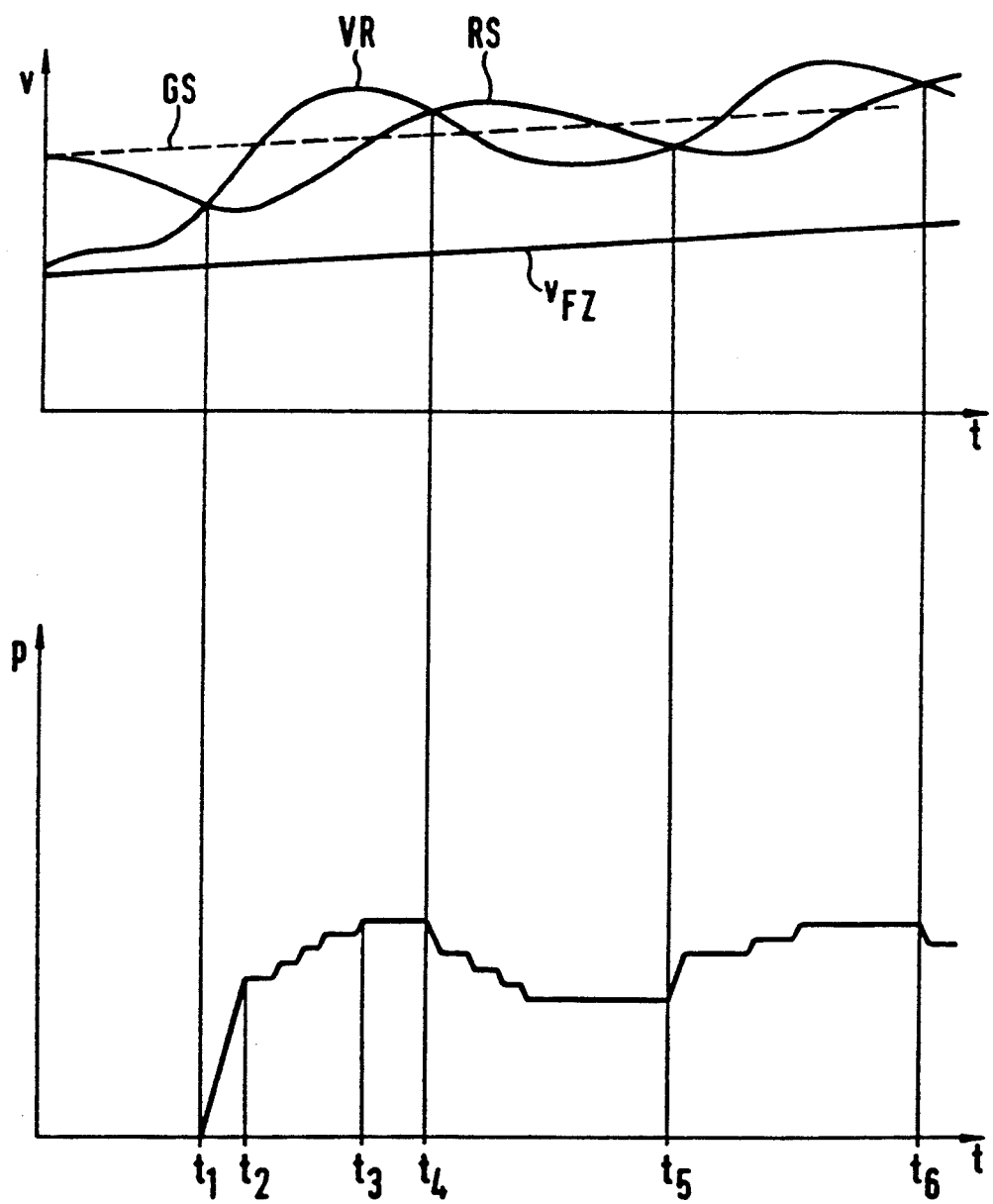
FIG. 2 shows the pattern of the wheel slip, of the control threshold, and of the brake pressure in the wheel brake of the controlled wheel during a traction slip control process, i.e. during a start-up process wherein the traction slip control becomes operative.

The function of a circuit configuration according to the present invention will now be explained with reference to FIG. 2 showing in diagrams the processes during a controlled start-up operation. Referring to FIG. 2, the linearly rising vehicle speed is designated by $v_{FZ}$. Once the traction slip of the controlled wheel exceeds a predetermined value, the traction slip control will commence. Hitherto, commencement of the control has been determined by a fixed limit value, viz. by the basic threshold GS shown in broken lines in FIG. 2. However, in the practice of the present invention, the wheel pattern and the wheel slip VR, respectively, are compared to the pattern of a control threshold RS. The control threshold is composed of the basic threshold GS and a value of correction f(+b), arising from the formula $$RS = GS + f(+b)$$

The correlation $$f(+b) = V_{R1} \times b_{gef}/g$$

applies to the foregoing value of correction or function f(+b), wherein "$b_{gef}$" means the filtered wheel slip acceleration and "g" means the gravitational force constant and wherein a value of between 6 and 10 km/h may be feasible for the wheel speed $V_{R1}$.

The control deviation between the control threshold RS and the wheel slip VR determines the commencement of the brake pressure control, i.e. it determines the brake pressure build-up and the brake pressure decrease. As shown by the lower diagram of FIG. 2, the brake pressure increase will commence at the time $t_1$ at which the wheel slip characteristic VR intersects the control threshold RS. The control deviation, i.e. the difference between the wheel acceleration characteristic VR and the control threshold RS, as well as the wheel slip acceleration, determine the gradient of the brake pressure build-up. In the example as shown, first, in the period of time $t_1-t_2$, the brake pressure feed commences with a steep gradient to be continued until time $t_3$ with a flat gradient, followed by a phase of constant pressure. At time $t_4$, the wheel slip characteristic VR falls below the control threshold RS resulting in a brake pressure decrease which, again, is determined by the control deviation and by the wheel acceleration. At the time $t_5$, a brake pressure control, again, is effected, first at a steep and then at a flat gradient followed by a phase of constant brake pressure. At time $t_6$, the brake pressure can again be reduced.

The filtering of the wheel acceleration is intended to prevent the effects of high-frequency fluctuations caused by interferences.

Due to the use of a variable control threshold, as taught by the present invention, a very precise adjustment of the traction slip control to the respective situation is attained. On the one hand, the traction slip control commences at a relatively low, wheel slip; at the management time $t_1$, the basic threshold GS has not yet been attained. On the other hand, a pressure decrease (time $t_4$) already commences at a wheel slip still above the basic threshold GS. The entire brake pressure pattern is adapted very precisely to the brake pressure requirements.

Consequently, an efficient traction slip control will be attained with no excessive load on the brake.

Figure 3:
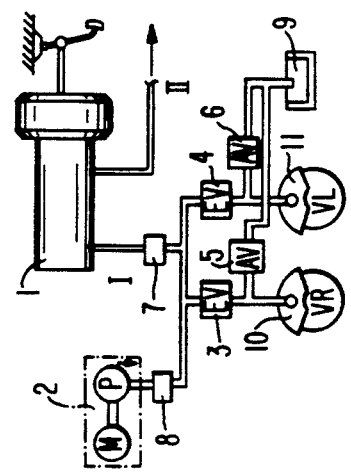
FIG. 3 is a schematic diagram of a brake system with anti-lock control and traction slip control with which the present invention can be used.

Referring to FIG. 3, the brake system which is illustrated is composed of a pedal-operated braking pressure generator 1, an auxiliary-pressure source 2, for example, an electromotively driven hydraulic pump, and multiple-way valves 3 to 8. A braking pressure generator with two hydraulically isolated brake circuits I, II is provided. For the sake of clarity, the arrangement of the valves and the connection to the auxiliary pressure source in the second brake circuit II are not depicted.

The valve pairs 3, 4 and 5, 6 each provide for the individual modulation of the braking pressure in the connected wheel brake 10 and/or 11 of the front wheel VR and/or VL. Valves 3, 4 are inlet valves (EV) opened in their initial position, while outlet valves (AV) 5 and 6 are normally closed. For pressure decrease, the inlet valves 3, 4 are closed, and pressure fluid out of the wheel brakes is discharged by way of the outlet valves 5, 6 into a pressure supply reservoir 9, from which the pressure fluid can be returned into the brake circuits in a known fashion.

By means of the valves 7 and 8, the auxiliarypressure source 2 instead of the braking pressure generator 1 can be connected to the wheel brakes. For instance, for traction slip control, the hydraulic pump of the auxiliary-pressure source 2 is put into operation, and pressure fluid is introduced by way of the valve 8 into the wheel brake of the imminently spinning wheel VR and/or VL. Change-over of the inlet valve 7 prevents discharge of pressure fluid by way of the braking pressure generator 1 in this control mode.

Figure 4:
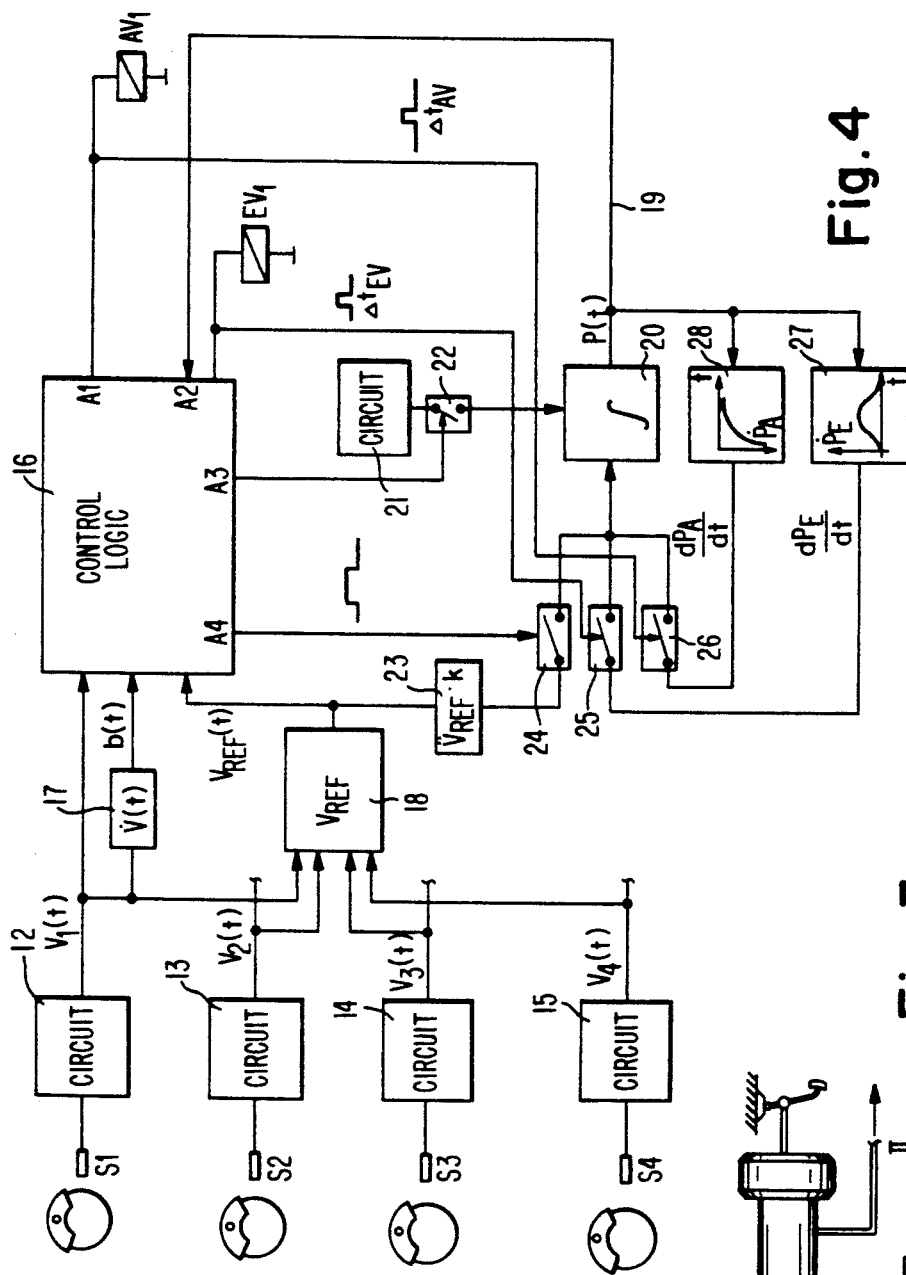
FIG. 4 is a block diagram of a circuit configuration for anti-lock control and traction slip control in which the present invention can be incorporated.

Referring to FIG. 4, the rotational behavior of the individual vehicle wheels is ascertained by way of sensors S1 to S4. The output signal of these sensors is first of all processed by way of trigger circuits, transducers and the like which are symbolized by the circuits 12 to 15. The output signals of these circuits which represent the respective wheel speeds $v_1(t)$ to $v_4(t)$ are delivered further to a control logic 16. Further, differentiation of the wheel speed provides the deceleration and/or acceleration (b(t)) by means of differentiators 17 (the corresponding similar block units for the processed sensor signals S2 to S4 have not been shown for clarity). The corresponding signals also are fed to the control logic 16. Finally, comparing and logically combining of the wheel-speed signals in a reference circuit 18 derives the so-called reference speed which, as a reference quantity, likewise is required for determining the wheel slip and, respectively, the rotational behavior of the individual wheels.

The outputs A1 and A2 of the control logic 16 lead directly to the inlet and outlet pair $EV_1/AV_1$ of a wheel that is controllable individually or jointly with other wheels. The signal representative of the pressure variation p(t) and/or the wheel pressure pattern is supplied to the output of an integrator 20 and is introduced into the control logic 16 by way of signal path 19. When driving normally, signalled to the control logic, by way of an output A3, are specific start conditions or initial conditions which are maintained by way of the circuit 21. After a control logic, the integrator is reset via the circuit 21 into its initial position.

On the other hand, normal braking, that is, without slip control, is signalled to the control logic 16 by way of the output A4. By way of a differentiating circuit 23 and a switch 24, a signal representative of the change in the vehicle deceleration is processed in the integrator 20. In the present case, the second time derivative $v_{REF}$ is evaluated after being multiplied with a factor k, which latter factor among others depends on the axle load distribution, for determining the integrator contents and thus for determining, for example, the initial pressure upon the commencement of a control action.

The commencement of an anti-lock control is derived from the actuating signals of the outlet valves $AV_1$ and inlet valves $EV_1$ supplied to the outputs A1, A2 of the control logic 16. Actuation of the valves $EV_1/AV_1$ results in the switches 25, 26 closing for the duration of the valve-actuating signals and, thereby, in the delivering of the pressure-differential quotients $dp_E/dt$ and/or $dp_A/dt$ to the integrator 20, the quotients being formed in the differentiators 27 and 28, respectively. In this manner, with the aid of the integrator 20, a wheel pressure pattern is formed of the intervals of excitation of the inlet and outlet valves relative to the braking-pressure-increase and braking-pressure-decrease characteristic curves which are memorized in the differentiators 27, 28 and relative to the initial conditions which are introduced by way of the stage 23 and the switch 24, and corresponding information is fed back to the control logic by way of signal line 19. The output of the integrator always produces an image of the pressure prevailing in the associated wheel brake or in the brake system and thus an important information input to the anti-lock or traction slip control and, respectively, for adjusting a braking pressure that is optimal for the desired control. The setting of the basic threshold, namely the predetermined traction slip value, and the comparison of measured wheel slip with the control threshold, namely the basic threshold and wheel slip acceleration, to develop the traction slip control when the wheel slip exceeds the control threshold can be accomplished by the control logic 16.

What is claimed:

1. Traction slip control apparatus for a wheel mounted on a vehicle, said apparatus comprising:
   means for setting a basic threshold corresponding to a predetermined traction slip value;
   means for developing an indication of the speed of a wheel mounted on a vehicle;
   means for developing an indication of the speed of said vehicle on which said wheel is mounted;
   means responsive to said indication of wheel speed and said indication of vehicle speed for developing an indication of wheel slip;
   means responsive to said indication of wheel slip for developing an indication of wheel slip acceleration;
   means for comparing said indication of wheel slip with a variable control threshold of wheel slip dependent 17 upon said basic threshold and said wheel slip acceleration and for developing a traction slip control when said indication of wheel slip exceeds said control threshold;
   and means responsive to said traction slip control for controlling the operation of a brake associated with said wheel.

2. Traction slip control apparatus according to claim 1 wherein said variable control threshold is the sum of said basic threshold and a product of a constant and said wheel slip acceleration.

3. Traction slip control apparatus according to claim 2 wherein said basic threshold varies with said speed of said vehicle.

4. A circuit configuration for an automotive vehicle having traction slip control for controlling brake pressure in a wheel brake associated with a wheel mounted on said automotive vehicle, said circuit configuration comprising:

(a) means for developing an indication of the speed of a wheel mounted on a vehicle;
   (b) means for developing an indication of the speed of said vehicle on which said wheel is mounted;
   (c) means responsive to said indication of wheel speed and said indication of vehicle speed for developing an indication of wheel slip;
   (d) means responsive to said indication of wheel slip for developing an indication of wheel slip acceleration;
   (e) means for setting a basic threshold corresponding to a predetermined traction slip value;
   (f) means for developing a variable control threshold of wheel slip dependent upon said basic threshold and said wheel slip acceleration;
   (g) means for comparing said indication of wheel slip with said variable control threshold and for developing a traction slip control when said indication of wheel slip exceeds said control threshold;
   (h) means for determining a control deviation representative of the difference between said variable control threshold and said wheel slip; and
   (i) means, responsive to said traction slip control and said control deviation, for controlling the brake pressure of a wheel brake associated with said wheel.

5. A circuit configuration according to claim 4, wherein the brake pressure as controlled in the wheel brake is additionally taken into consideration in response to the control deviation and to the wheel slip acceleration.

6. A circuit configuration according to claim 5, wherein the pressure prevailing in the wheel brake, with the aid of a pressure model, is determinable by approximation.

7. A circuit configuration according to claim 4, wherein the control threshold (RS) is formed according to the formula $$RS = GS + f(+b)$$

wherein the basic threshold (GS) corresponds to a predetermined slip value and wherein the value of the correction (f(+b)) is a function of the filtered wheel slip acceleration.

8. A circuit configuration according to claim 7, wherein the value of the correction F(+b) is derived according to the formula $$f(+b) = -k \times b_{gef}$$

wherein k is a constant and $b_{gef}$ is the filtered wheel slip acceleration.

9. A circuit configuration according to claim 8, wherein a wheel slip value dependent on the vehicle speed ($V_{FZ}$) serves as the basic threshold (GS).

10. A circuit configuration according to claim 9, wherein the brake pressure is increased once the wheel slip (VR) exceeds the control threshold (RS), and the brake pressure is decreased once the wheel slip (VR) falls below the control threshold (RS).

11. Traction slip control apparatus according to claim 3, wherein said basic threshold linearly decreases from an initial value of 20 km/h at a vehicle speed of 0 km/h to a value of about 10 km/h at a vehicle speed of about 25 km/h, and increases as the vehicle speed increases at vehicle speeds of above about 25 km/h.

* * * * *

UNITED STATES PATENT AND TRADEMARK OFFICE
CERTIFICATE OF CORRECTION

PATENT NO. : 5,293,315
DATED : March 8, 1994
INVENTOR(S) : Alexander Kolbe, Klaus Homus It is certified that error appears in the above—identified patent and that said Letters Patent is hereby corrected as shown below:

Claim 1, column 5, line 49 - delete "17"

Signed and Sealed this

Sixteenth Day of August, 1994

Attest:

BRUCE LEHMAN

Attesting Officer     Commissioner of Patents and Trademarks